(12) United States Patent
Mbouombouo et al.

(10) Patent No.: US 8,589,853 B2
(45) Date of Patent: Nov. 19, 2013

(54) TOTAL POWER OPTIMIZATION FOR A LOGIC INTEGRATED CIRCUIT

(75) Inventors: Benjamin Mbouombouo, Saratoga, CA (US); Ramnath Venkatraman, San Jose, CA (US); Ruggero Castagnetti, Menlo Park, CA (US)

(73) Assignee: LSI Corporation, Milpitas, CA (US)

( * ) Notice: Subject to any disclaimer, the term of this patent is extended or adjusted under 35 U.S.C. 154(b) by 40 days.

(21) Appl. No.: 13/103,461

(22) Filed: May 9, 2011

(65) Prior Publication Data
US 2012/0290994 A1 Nov. 15, 2012

(51) Int. Cl.
*G06F 9/455* (2006.01)
*G06F 17/50* (2006.01)

(52) U.S. Cl.
USPC .......................................... 716/133; 716/132

(58) Field of Classification Search
USPC .................................. 716/133, 132
See application file for complete search history.

(56) References Cited

U.S. PATENT DOCUMENTS

| | | | |
|---|---|---|---|
| 7,725,848 B2 | 5/2010 | Nebel et al. | |
| 7,802,217 B1 * | 9/2010 | Gopinath et al. | 716/109 |
| 2008/0244474 A1 * | 10/2008 | Turner et al. | 716/2 |
| 2010/0169847 A1 * | 7/2010 | Gupta et al. | 716/2 |

\* cited by examiner

*Primary Examiner* — Nha Nguyen
*Assistant Examiner* — Bryce Aisaka (57) ABSTRACT

A method of reducing total power dissipation for logic cells includes selecting a distribution of logic cells corresponding to at least one path, computing a dynamic to static power ratio for each logic cell in the distribution of logic cells and ranking the dynamic to static power ratio for each logic cell into a lower group, a middle group and an upper group of logic cells. Additionally, the method includes swapping the lower group of logic cells and the upper group of logic cells for a reconfigured middle group of logic cells and verifying path timing for the reconfigured middle group of logic cells. Methods of reducing total power dissipation using Boolean equations and for logic cell sets are also provided.

8 Claims, 6 Drawing Sheets

TOTAL POWER OPTIMIZATION FOR A LOGIC INTEGRATED CIRCUIT

TECHNICAL FIELD

This application is directed, in general, to integrated circuits and, more specifically, to methods of reducing total power dissipation for logic cells, for groups of logic cells using Boolean equations and for logic cell sets.

BACKGROUND

Integrated circuits can employ many thousands of circuits connected to perform logic functions. Total power expended is a large concern in many designs due to environmental and system issues as well as for portable devices designed to use battery power that are required to achieve the lowest possible power consumption while meeting their performance targets. Electronic design automation (EDA) tools may be used to assist in the design of these integrated circuits. Existing approaches used by these EDA tools optimize either static or dynamic power as separate independent parameters. This approach often results in one being reduced while the other is not, and in many cases, to higher total power consumption. Improvements in this area would prove beneficial to the art.

SUMMARY

Embodiments of the present disclosure provide methods of reducing total power dissipation for logic cells, for groups of logic cells using Boolean equations and for logic cell sets. In one embodiment, the method of reducing total power dissipation for logic cells includes selecting a distribution of logic cells corresponding to at least one path, computing a dynamic to static power ratio for each logic cell in the distribution of logic cells and ranking the dynamic to static power ratio for each logic cell into a lower group, a middle group and an upper group of logic cells. Additionally, the method includes swapping the lower group of logic cells and the upper group of logic cells for a reconfigured middle group of logic cells and verifying path timing for the reconfigured middle group of logic cells.

In another aspect, the method of reducing total power dissipation using Boolean equations includes selecting a path, identifying at least one group of logic cells for analysis in the path and deriving Boolean equations for the at least one group of logic cells. Additionally, the method includes listing possible logic cell implementations for each Boolean equation while maintaining original transistor values and verifying path timing for the possible logic cell implementations to provide retained logic cells that achieve a path timing requirement. Correspondingly, the method also includes computing a total power dissipation for the retained logic cells and choosing a logic cell set from the retained logic cells corresponding to a minimum total power dissipation for the path.

In yet another aspect, the method of reducing total power dissipation for logic cell sets includes selecting a path, choosing a logic cell in the path, computing a starting total power for the logic cell and identifying logic cell implementations using different transistor values for logic cell swapping. The method also includes verifying path timing for the logic cell implementations to generate timing-verified logic cells that achieve a timing requirement for the path, comparing an ending total power of the timing-verified logic cells with the starting total power of the logic cell and selecting one of the timing-verified logic cells or the logic cell based on achieving a minimum total power for the path.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION

Reference is now made to the following descriptions taken in conjunction with the accompanying drawings, in which.

DETAILED DESCRIPTION

Conventional EDA tools can perform power optimization along with timing optimization for semiconductor devices. However, these tools do not achieve a minimum total power optimization because they address either static power requirements or dynamic power requirements separately as two independent optimizations. Embodiments of the present disclosure provide a concurrent, activity-dependent dynamic and static power optimization approach for semiconductor devices (e.g., a system on chip (SOC)) wherein a performance requirement of a design is maintained. During all stages of design implementation (i.e., whether at synthesis, placement or detailed routing), embodiments of the present disclosure entail designing an entire SOC and provide analysis and selection of a logic cell set having a reduced total power while meeting the performance target.

The variables of relevance in reducing total power are threshold voltage (Vt) of a standard logic cell, drive strength of the logic cell and logic cell functions. Typically, libraries are built with a low threshold voltage (LVT), a standard threshold voltage (SVT) and a high threshold voltage (HVT) along with different transistor channel lengths. A larger logic cell typically dissipates higher dynamic and static power.

Both threshold voltage and cell strength may be discrete in terms of their availability (e.g., logic cell sizes are typically 1×, 2×, etc.), and the threshold voltages are also discrete, as described above. Logic cell functions may be represented by a Boolean function that can be described using a variety of logic cell sets (e.g., AND, NAND, etc.). Logic cell sets for logic cell functions may span from simple with many cells to complex and fewer cells.

Tradeoffs between the two variables of threshold voltage and drive strength for the purpose of power reduction are considered, where power dissipation equations are addressed below. Consider a single cell (such as an inverter, NAND, NOR etc). The most significant component of leakage, especially at elevated temperatures, is the subthreshold leakage of the transistor. If a transistor size Sz represents the width of a transistor within the cell, then to a first order, the static power $P_{sta}$ is given by:

$$P_{sta} = I \text{leak} * Vdd, \tag{1}$$

where Ileak is the leakage current and Vdd is the supply voltage corresponding to the leakage current.

The source-to-drain subthreshold leakage current Ids (also denoted as $I_{leak}$) for a transistor is given by:

$$Ids = \mu eff * Cox * \frac{W}{L}(m-1)\left(\frac{KT}{q}\right)^2 e^{q(Vg-Vt)/mKT}(1 - e^{-qVds/kT}), \tag{2}$$

where μeff is the mobility of the device, Cox is the gate oxide capacitance per unit area, W is the width of the transistor, L is the channel length of the transistor, m is the body-effect coefficient, K is the Boltzmann constant, T is the absolute temperature (degrees K), q is the coulombic electron charge, Vg is the gate voltage, Vt is the threshold voltage and Vds is the drain to source voltage of the transistor.

In equation (2) and for a given voltage and temperature, the subthreshold leakage current Ids is clearly a function of W, the gate width, and the threshold voltage Vt. Thus, for a given voltage and temperature, equation (2) may be rewritten as:

$$I_{leak} = K_1 * Sz * e^{-K2*qVt/KT}, \tag{3}$$

where Sz is again the size of the cell (i.e., the width of a transistor within the cell), Vt is the threshold voltage of the transistor and q is the coulombic electron charge, as before. K1 and K2 are constants obtained by combining multiple terms in equation (2) that are voltage and temperature dependent. K is the Boltzmann constant, and T is the absolute temperature, as before.

Dynamic power $P_{dym}$ can be written as:

$$P_{dyn} = a*f*C*Vdd^2 = K_{cell}*a*f*Vdd^2*Sz. \tag{4}$$

where a is a switching activity factor, f is an operating frequency, C is a load capacitance, Vdd is again the supply voltage, Sz is the cell size and Kcell is a constant specific to a given cell.

From equations (3) and (4), it may be appreciated that the two "library" variables of transistor size Sz and threshold voltage Vt impact static and dynamic power. Static power is a strong function of Sz and Vt, for a given voltage and temperature. Dynamic power is largely dependent on Sz, for a given voltage and temperature, and less dependent on Vt.

For power minimization, timing delay is the most important constraint. As described previously, logic cell size Sz and threshold voltage Vt can be traded for timing delay. Timing delay, on the other hand, is a strong function of the drive strength of the logic cell where it is inversely proportional to drive strength. To a first order, the drive strength of the cell is determined by the saturation drive current Idsat of the transistors within the cell, which can be expressed as:

$$Idsat = K_4 * Sz * (Vdd - Vt)^\alpha, \tag{5}$$

where K4 is a constant and Sz, Vdd and Vt are as defined before. The factor α is a constant that is classically equal to two, but is between one and two in modern transistors.

It may be appreciated that as Sz or Vt is modified in a direction leading to reduced static and dynamic power, the drive strength of the cell will also be reduced, leading to an increased timing delay. Any reduction in power due to reduced Sz or increased Vt will result in reduced Idsat (and vice-versa for changes in opposite directions). It may also be appreciated that a given timing delay can be achieved using a wide range of combinations of Sz and Vt. A choice of higher Vt will lower static power but will require higher Sz (i.e., higher dynamic power) to maintain a same timing delay. Similarly, a choice of lower Sz will lower both static and dynamic power, but will require a switch to lower Vt in order to meet timing constraints, which will increase the static leakage.

Consider the following scenarios in a given design. A given timing-constrained path in a design can be made to dissipate lower power by:

a) Converting logic cells into a higher Vt while keeping the logic cell size the same and verifying that timing constraints are satisfied. Here, static power is reduced and dynamic power remains the same.

b) Converting logic cells into a higher Vt and reducing logic cell size. Cases a) and b) may be done in sequence and logic cell sizes can be reduced until timing constraints continue to be met. Here, both static and dynamic powers are reduced.

c) Keeping the same Vt but reducing the logic cell size. Here, static and dynamic powers are both reduced.

d) Decreasing Vt but also reducing the logic cell size. This may lead to the static leakage current (i.e., static power) increasing accompanied by a reduction in the dynamic power (see relevant equations above).

Case d) is important to consider for designs. Often, a design implementation tool may have achieved timing without optimizing for total minimum power. A power reduction strategy needs to be considered in the context of the ratio of static to dynamic power dissipated in a design. For instance, if a given path dissipates very low dynamic power (i.e., employs a low switching activity factor), then the focus of power reduction can be based purely on static power reduction through increasing Vt, and case strategies a), b) and c) above may be employed.

On the other hand, if a given path dissipates mostly dynamic power (e.g., due to its switching activity factor or high frequency operation), then cell size reduction, along with using lower Vt cells, is typically the most important strategy for power reduction. An increase in static power may typically be more than compensated for by a reduction in dynamic power.

A given integrated circuit chip may have millions of paths, each with its own timing slack and switching activity factor. Accordingly, the ratio of static power to dynamic power dissipated may vary significantly from logic cell to logic cell. To minimize total power, a strategy is provided by embodiments of the present disclosure that optimizes each cell in the Sz-Vt space, while maintaining overall timing constraints.

Figure 1:
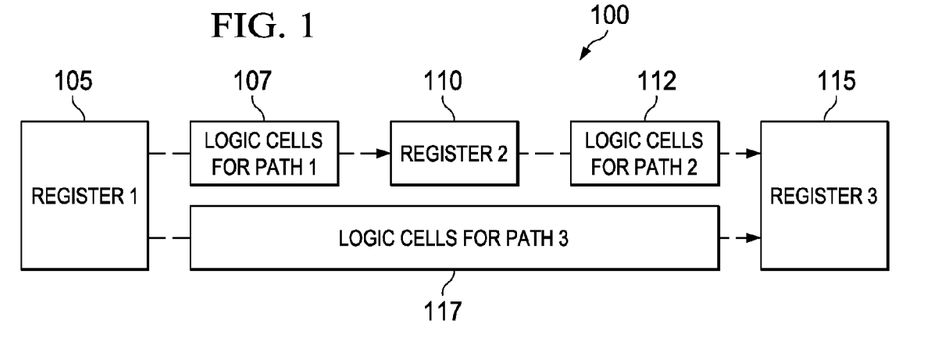
FIG. 1 illustrates a diagram of a portion of an integrated circuit constructed according to the principles of the present disclosure.

FIG. 1 illustrates a diagram of a portion of an integrated circuit, generally designated 100, constructed according to the principles of the present disclosure. The portion of the integrated circuit 100 includes first, second and third digital registers 105, 110, 115 and first second and third paths 107, 112 and 117 wherein each path contains a corresponding set of logic cells.

Embodiments of the present disclosure analyze different combinations of logic cells or groups of logic cells to achieve a reduced (a local minimum) total power (i.e., dynamic and static power together) for each path. These embodiments are based on finding a combination of cells that provide a lowest total power for the path (herein defined as "total power optimization") based on available transistor design parameters while meeting the performance or timing requirements for the path.

FIGS. 2A, 2B, 2C and 2D illustrate an example cell function and corresponding cell sets, generally designated 200, 210, 215, 220, as may be employed in the paths of FIG. 1. Each Boolean function may be described using various sets of cells ranging from more simple logic cells to fewer, more complex logic cells. A specific example is used below to describe how a Boolean function can be implemented using different logic cell sets.

Figure 2A:
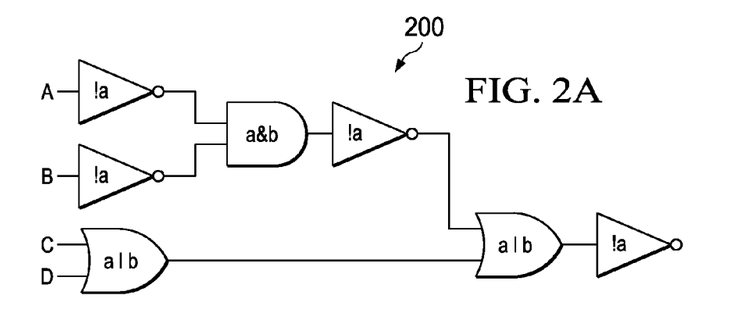
FIGS. 2A, 2B, 2C and 2D illustrate an example logic cell function and corresponding logic cell sets as may be employed in the paths of FIG. 1.
Figure 2B:
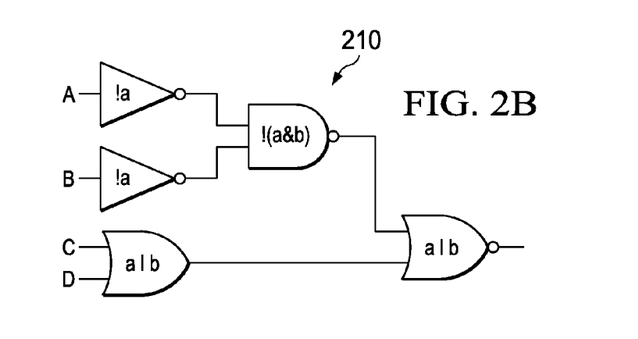
Figure 2C:
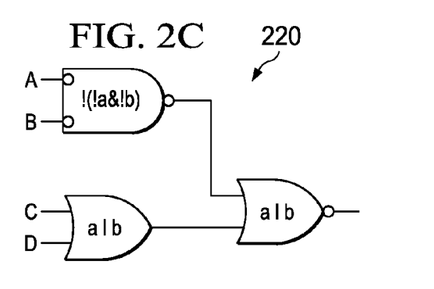
Figure 2D:
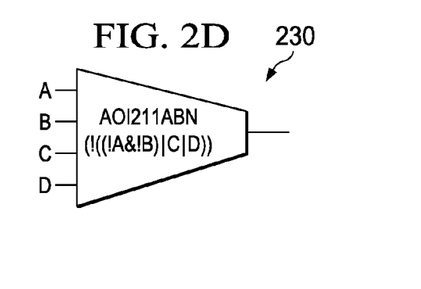

As an example, the specific Boolean function (!A&!B&!C&D) is to be implemented using different logic cell sets. FIG. 2A illustrates a seven logic cell solution for the example Boolean equation. FIG. 2B provides a second option using a five logic cell solution for the same Boolean equation. FIG. 2C shows a three logic cell solution, and FIG. 2D illustrates a one logic cell solution. Of course, total power varies in this spectrum of available logic cell sets.

Figure 3:
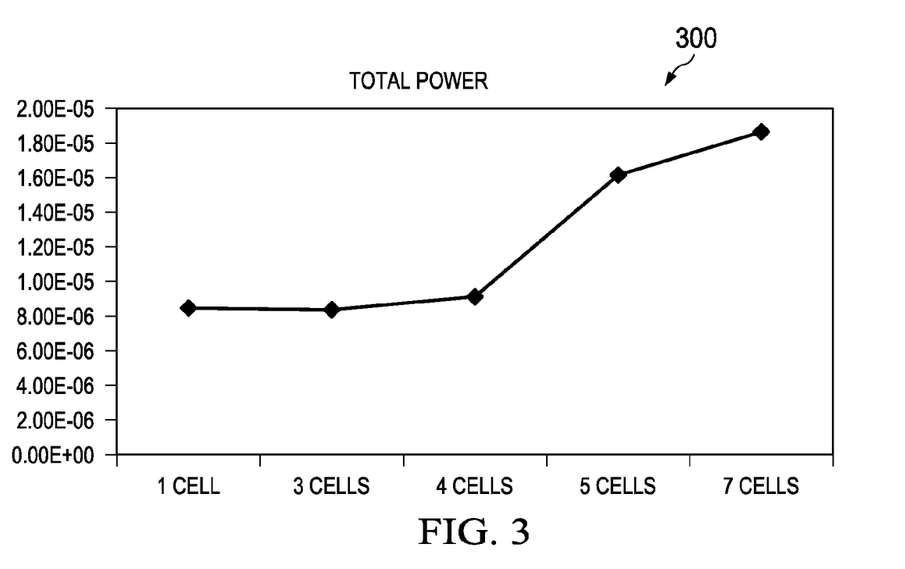
FIG. 3 illustrates a graph of total power expended for a similar collection of logic cell sets.

FIG. 3 illustrates a graph of total power expended, generally designated 300, for a similar collection of logic cell sets. Generally, it may be noted that smaller logic cell sets dissipate less total power. However, smaller logic cell sets are often highly tailored requiring more design time.

Figure 4:
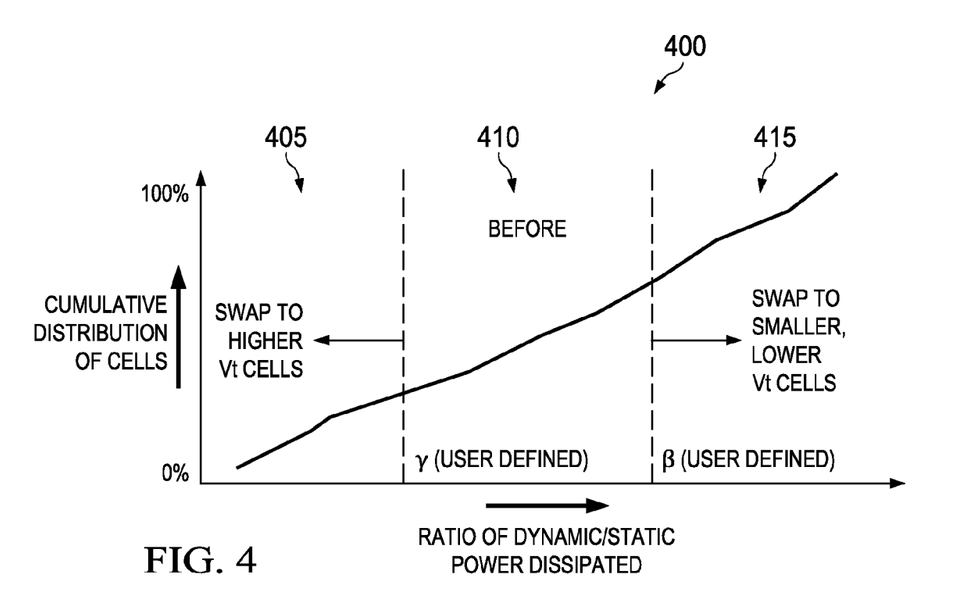
FIG. 4 illustrates a cumulative distribution of logic cells corresponding to their various dynamic to static power ratios for a path.

FIG. 4 illustrates a cumulative distribution of logic cells, generally designated 400, corresponding to their various dynamic to static power ratios ($\eta$) for a path. The cells are divided into lower, middle and upper ratio groups 405, 410, 415, as shown. A minimum allowable dynamic to static power ratio ($\gamma$) and a maximum allowable dynamic to static power ratio ($\beta$) for the middle group is user defined, as shown. This distribution may generally correspond to a starting set of logic cells for the path.

Figure 5:
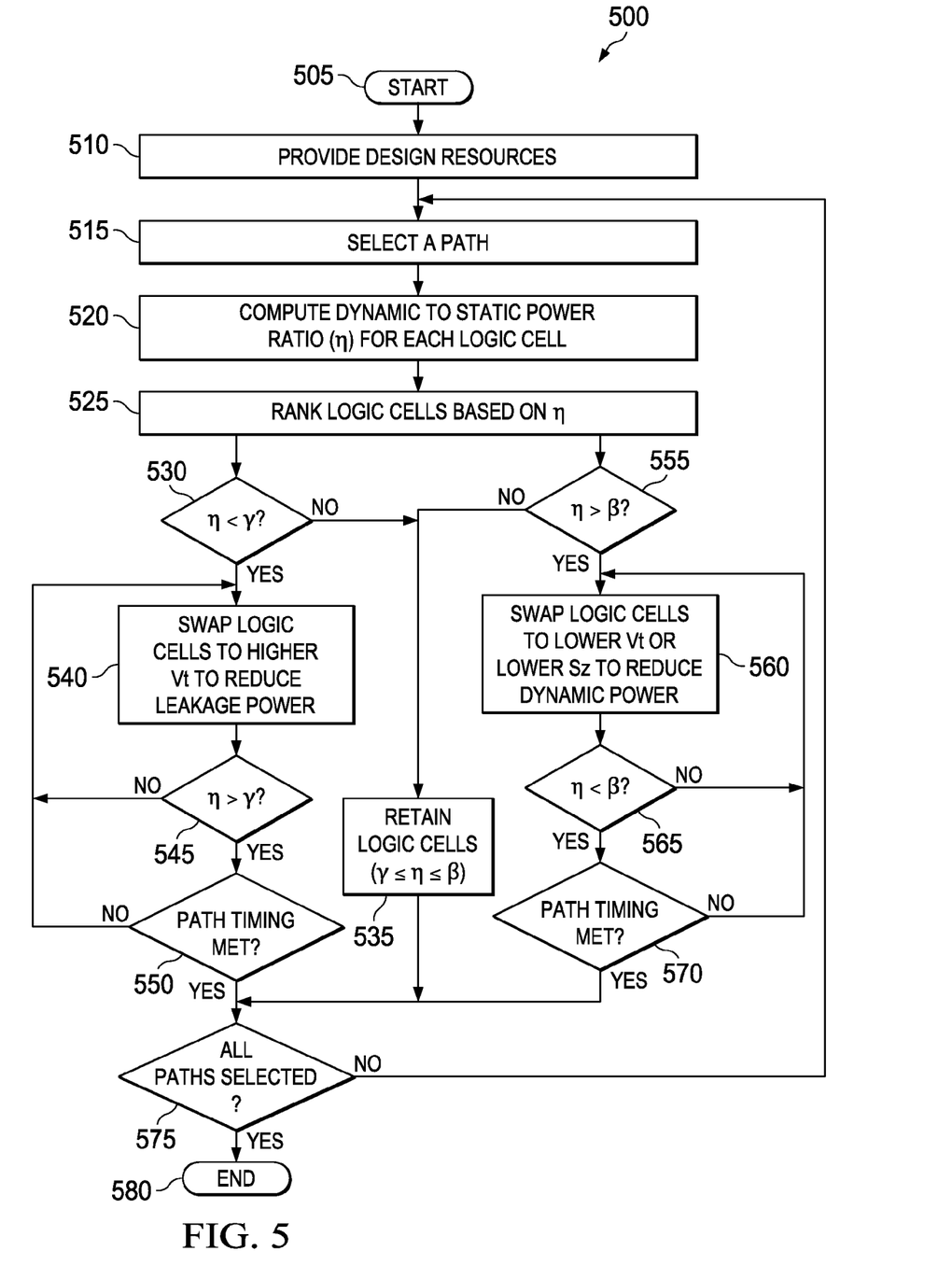
FIG. 5 illustrates a flow diagram corresponding to a method of reducing total power dissipation for logic cells such as the starting set of logic cells of FIG. 4, carried out according to the principles of the present disclosure.

FIG. 5 illustrates a flow diagram corresponding to a method of reducing total power dissipation for logic cells, generally designated 500, such as the starting set of logic cells of FIG. 4, carried out according to the principles of the present disclosure. The method 500 starts in a step 505 and design resources are provided in a step 510. In the illustrated embodiment, the design resources may include a value change dump (VCD), a static timing analysis (STA) database and a logic cell library.

The VCD includes dump files that contain binary values of a "one" or a "zero" (or may be undefined) for each path in a design, since a dynamic power dissipated in a path is related to whether the path is switching from an OFF to ON state (zero to one) or from an ON to OFF state (one to zero). The STA database contains timing information for each path in a design. For example, this timing information may be a ramp-time, which is the time it takes for a signal corresponding to a path to transition from one state to another state. Additionally, it may be a timing arc, which is the time it takes for a signal to propagate from an input of a logic cell to the output of the same logic cell. STA information may also be required to correctly capture dynamic power associated with a design implementation. The logic cell library may be a standard logic cell library, which is a set of primary elements that is used to design a semiconductor chip and may consist of hundreds of cell types (e.g., the simplest cell is an inverter).

At least one path is selected having a distribution of logic cells (such as the distribution of logic cells in FIG. 4), in a step 515, and then a dynamic to static power ratio ($\eta$) is computed for each logic cell in the distribution of logic cells, in a step 520. The dynamic to static power ratio $\eta$ for each logic cell is ranked into a lower group, a middle group and an upper group of logic cells, in a step 525. A decisional step 530 determines those logic cells where the dynamic to static power ratio $\eta$ is less than a minimum allowable dynamic to static power ratio $\gamma$. Logic cells not meeting this test are retained in the middle group of logic cells, in a step 535.

Those logic cells where the dynamic to static power ratio $\eta$ is less than the minimum allowable dynamic to static power ratio $\gamma$ in the decisional step 530 are swapped for cells having a higher threshold voltage Vt to reduce leakage (static) power in a step 540. This swapping continues until the dynamic to static power ratio $\eta$ is greater than the minimum allowable dynamic to static power ratio $\gamma$ in a decisional step 545 and path timing is verified in a decisional step 550 to provide a reconfigured middle group of logic cells.

Correspondingly, a decisional step 555 determines those logic cells where the dynamic to static power ratio $\eta$ is greater than a maximum allowable dynamic to static power ratio $\beta$. Logic cells not meeting this test are retained in the middle group of logic cells, in the step 535, as before. Those cells where the dynamic to static power ratio $\eta$ is greater than the maximum allowable dynamic to static power ratio $\beta$ in the decisional step 555 are swapped to cells having a lower threshold voltage Vt or lower transistor size Sz to reduce dynamic power in a step 560. This swapping continues until the dynamic to static power ratio $\eta$ is less than the maximum allowable dynamic to static power ratio $\beta$ in a decisional step 565 and path timing is verified in a decisional step 570 thereby resulting in additions to the reconfigured middle group of logic cells.

Figure 6:
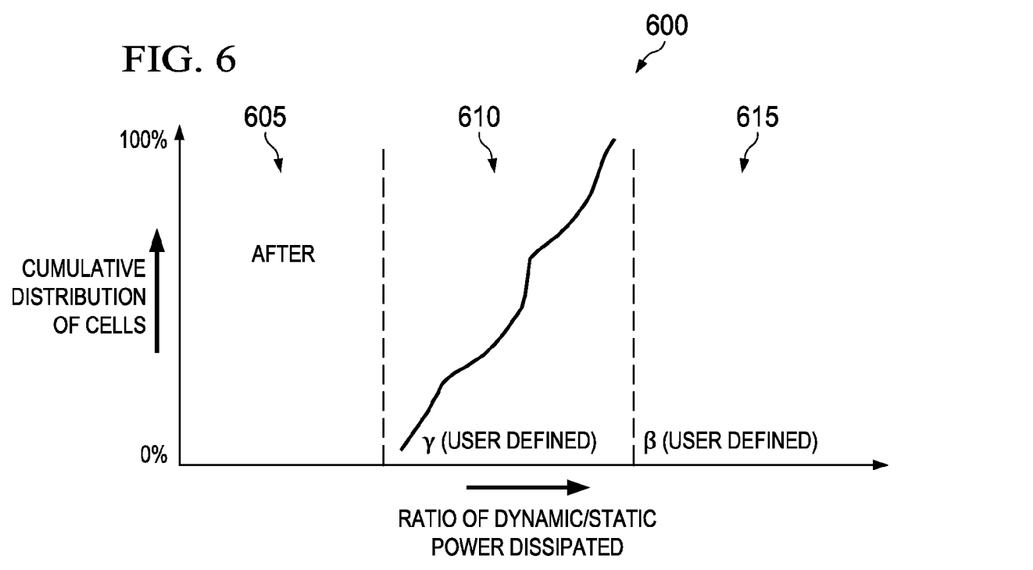
FIG. 6 illustrates a new cumulative distribution of logic cells where lower and upper groups are vacant of cells that have been swapped into the middle group, as discussed with respect to FIG. 5.

The reconfigured middle group of logic cells and logic cells retained in the middle group of logic cells form the new set of middle group cells that provide reduced total power for the path. FIG. 6 illustrates this new cumulative distribution of logic cells where the lower and upper groups of logic cells 605, 615 are vacant of logic cells that have been swapped into the middle group of logic cells 610. A decisional step 575 in FIG. 5 determines if all paths have been selected, and the method 500 returns to select a new path in the step 515 if all paths have not been selected, or ends in a step 580 if all paths have been selected.

Figure 7:
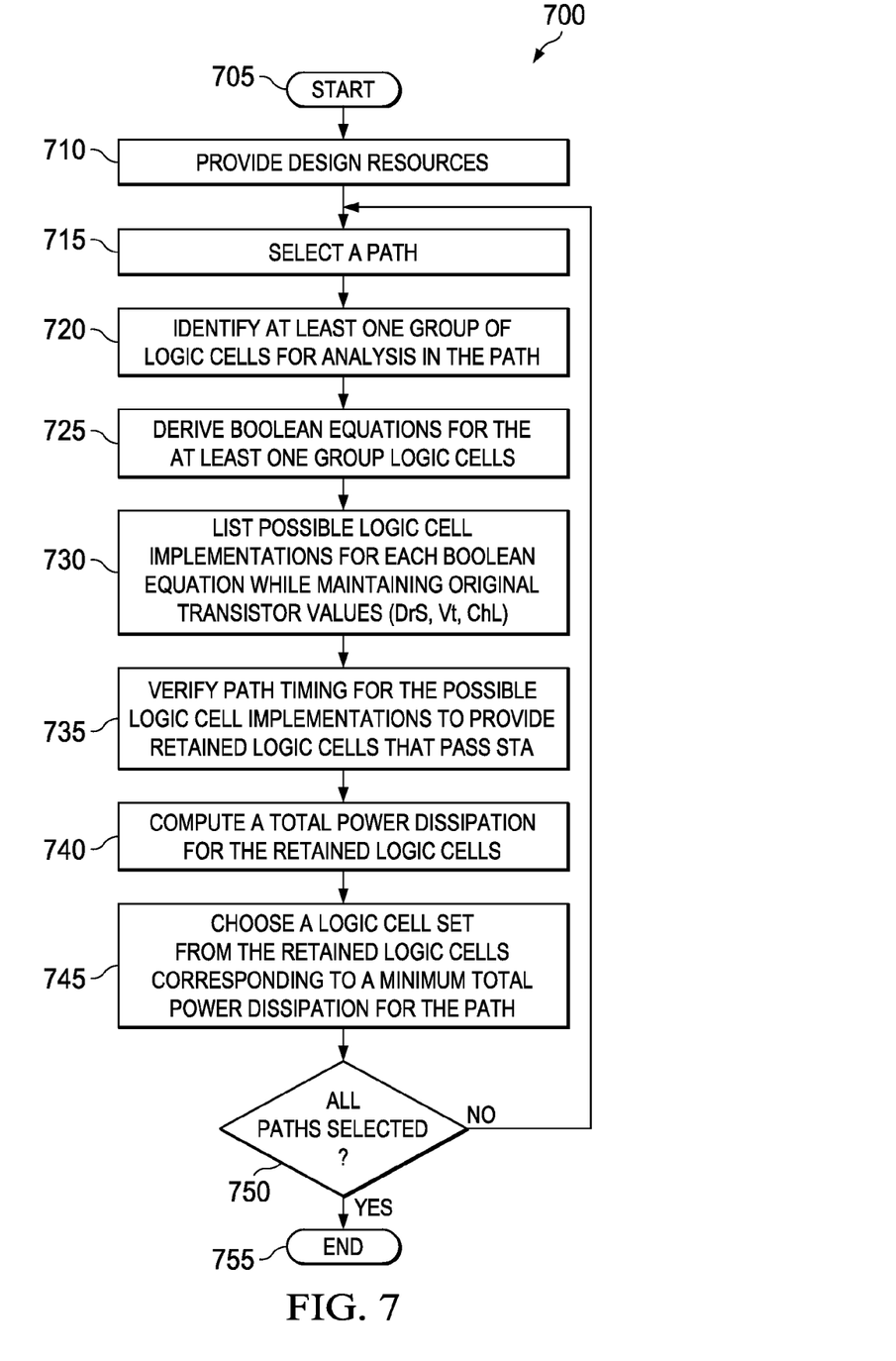
FIG. 7 illustrates a flow diagram corresponding to a method of reducing total power dissipation using Boolean equations carried out according to the principles of the present disclosure.

FIG. 7 illustrates a flow diagram corresponding to a method of reducing total power dissipation using Boolean equations, generally designated 700, carried out according to the principles of the present disclosure. A main focus of the method 700 is on the selection of logic cell sets that provide a minimum total power. The method 700 starts in a step 705 and design resources are provided in a step 710. The design resources may include a value change dump (VCD), a static timing analysis (STA) database and a logic cell library, as discussed before.

A path is selected in a step 715 and at least one group of logic cells is identified for analysis in the path, in a step 720. Boolean equations are derived for the at least one group of logic cells, in a step 725. The group of logic cells identified for analysis may include single logic cells, complex logic cells or a combination of simple and complex logic cells. Possible logic cell implementations are listed for each Boolean equation while original transistor values at maintained, in a step 730. In one embodiment, these original transistor values correspond to drive strength, threshold voltage or channel length.

Path timing is verified for the possible logic cell implementations to provide retained logic cells that pass a timing requirement in a step 735. In one embodiment, the retained logic cells conform to a static timing analysis for the path.

Total power dissipation is computed for the retained logic cells in a step 740, and a logic cell set is chosen from the retained logic cells corresponding to a minimum total power dissipation for the path, in a step 745. A decisional step 750 determines if all paths have been selected and the method 700 returns to select a new path in the step 715 or ends in a step 755 if all paths have been selected.

Figure 8:
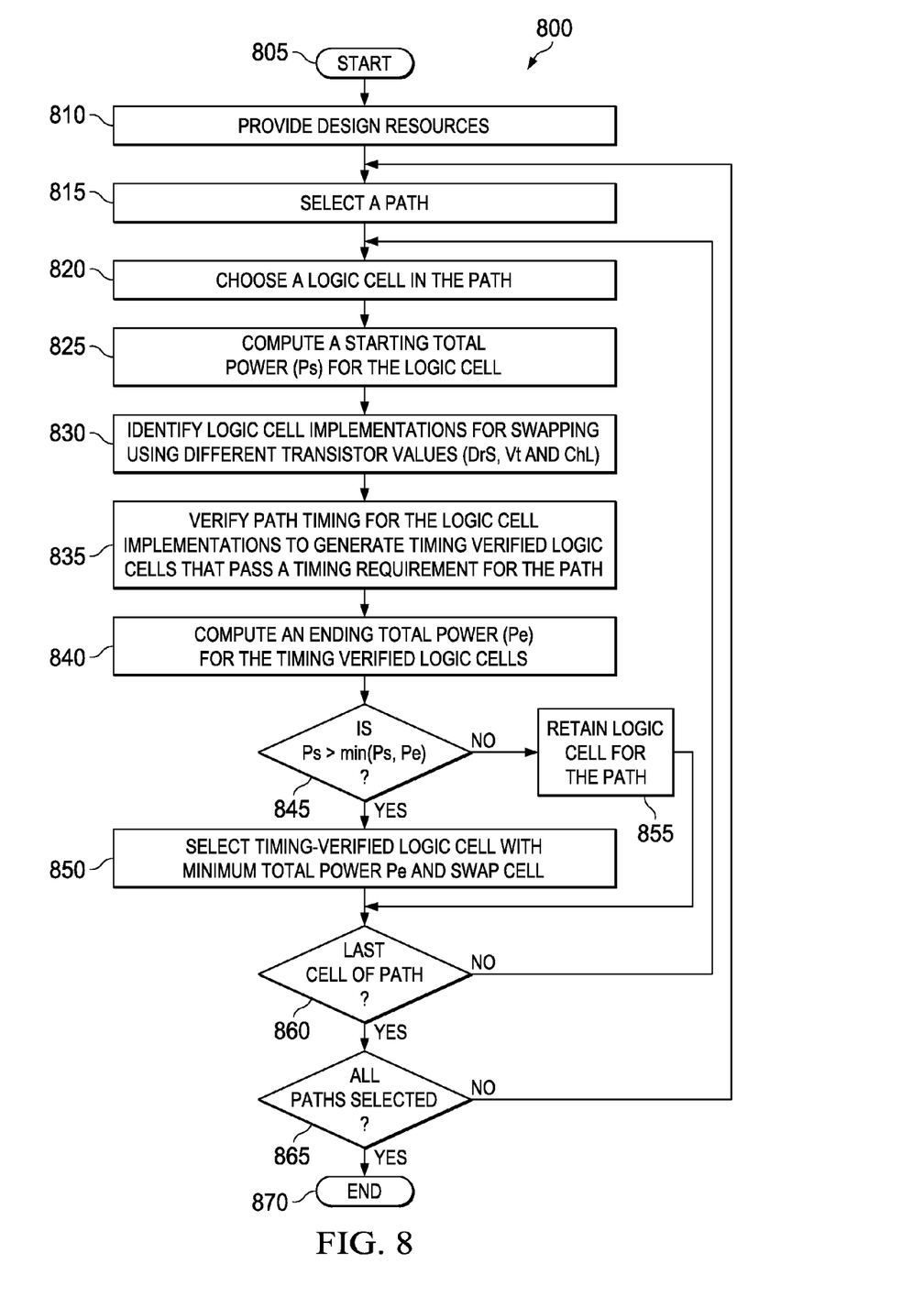
FIG. 8 illustrates a flow diagram corresponding to a method of reducing total power dissipation for logic cell sets carried out according to the principles of the present disclosure.

FIG. 8 illustrates a flow diagram corresponding to a method of reducing total power dissipation for logic cell sets, generally designated 800, carried out according to the principles of the present disclosure. A main focus of the method 800 is an optimization of individual logic cells within a logic cell set, such as those logic cell sets selected in the method 700, above. The method 800 starts in a step 805 and design resources are provided, in a step 810. The design resources may include a value change dump (VCD), a static timing analysis (STA) database and a logic cell library, as before.

A path is selected in a step 815 and a logic cell in the path is chosen, in a step 820. A starting total power (Ps) for the logic cell is computed, in a step 825, and logic cell implementations using different transistor values are identified for cell swapping, in a step 830. In one embodiment, the different transistor values include drive strength, threshold voltage or channel length. Path timing for the logic cell implementations is verified to generate timing-verified logic cells that achieve a timing requirement for the path, in a step 835. In one embodiment, the timing requirement is a static timing analysis (STA) for the path.

An ending total power (Pe) is computed for the timing-verified logic cells, in a step 840, and a decisional step 845 determines if the starting total power Ps is greater than a minimum of the starting total power Ps and the ending total power Pe. If the starting total power Ps is greater, a timing-verified logic cell is selected with minimum total power Pe and swapped for the logic cell, in a step 850. If the starting total power Ps is not greater as determined in the decisional step 845, the logic cell is retained for the path, in a step 855.

A decisional step 860 determines if the last cell of the current path has been selected, and if it has not been selected, the method 800 returns to the step 820 and selects another logic cell in the current path. If the last cell has been selected for the current path, a decisional step 865 determines if all paths have been selected. If all paths have not been selected, the method 800 returns to the step 815 and selects a new path for consideration. If all paths have been selected, the method 800 ends in a step 870.

While the methods disclosed herein have been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Figure 9:
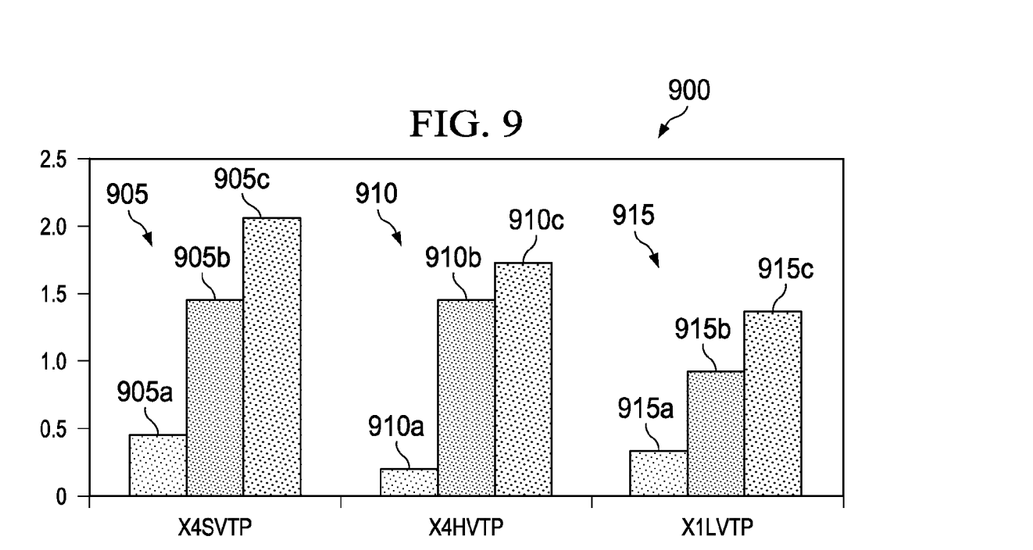
FIG. 9 illustrates a comparison of leakage, dynamic and total powers for three power applications.

FIG. 9 illustrates a comparison of leakage, dynamic and total powers, generally designated 900, for three power applications. The comparison 900 includes an application 905 where power reduction was not addressed and serves as a base case. The comparison 900 also includes an application 910 where conventional power reduction was addressed employing separate reductions for static and dynamic powers. The comparison 900 further includes an application 915 where an embodiment of the present disclosure for total power reduction was employed.

The application 905 includes a leakage power 905a, a dynamic power 905b and total power 905c. Correspondingly, the application 910 includes a leakage power 910a, a dynamic power 910b and total power 910c, and the application 915 includes a leakage power 915a, a dynamic power 915b and total power 915c. The leakage power 910a and total power 910c offer improvement over the leakage power 905a and the total power 905c while the dynamic powers 910b and 905b are substantially equal. Although the leakage power 915a is slightly greater than the leakage power 910a, it is smaller than the leakage power 905a. Clearly, the dynamic power 915b and total power 915c are smaller than their corresponding counterparts of the dynamic power 905b and total power 905c and the dynamic power 910b and total power 910c.

Those skilled in the art to which this application relates will appreciate that other and further additions, deletions, substitutions and modifications may be made to the described embodiments.

What is claimed is:

1. A method of reducing total power dissipation for logic cells of an integrated circuit, comprising:
    selecting, by a processor, a distribution of logic cells corresponding to at least one path;
    computing a dynamic to static power ratio for each logic cell in the distribution of logic cells;
    ranking the logic cells within the distribution of cells into a lower group, a middle group and an upper group of logic cells according to the dynamic to static power ratio for each logic cell, wherein the middle group is user defined according to a minimum and a maximum allowable dynamic to static power ratio;
    swapping cells from among the lower group of logic cells and the upper group of logic cells with cells of different transistor threshold voltage or different transistor size until all cells have a dynamic to static power ratio between the minimum and maximum allowable dynamic to static power ratio resulting in a reconfigured middle group of logic cells; and
    verifying path timing for the reconfigured middle group of logic cells.

2. The method as recited in claim 1 wherein the lower group of logic cells is reconfigured by increasing a transistor threshold voltage to reduce a leakage current of the lower group.

3. The method as recited in claim 1 wherein the upper group of logic cells is reconfigured by decreasing a transistor threshold voltage to reduce a dynamic power of the upper group.

4. The method as recited in claim 1 wherein the upper group of logic cells is reconfigured by decreasing a transistor size to reduce a dynamic power of the upper group.

5. The method as recited in claim 1 wherein a maximum allowable dynamic to static power ratio for the middle group is user defined.

6. The method as recited in claim 1 wherein a minimum allowable dynamic to static power ratio for the middle group is user defined.

7. The method as recited in claim 1 further comprising providing design resources to facilitate reducing total power dissipation.

8. The method as recited in claim 7 wherein the design resources are selected from the group consisting of:
    a value change dump;
    a static timing analysis database; and
    a logic cell library.

* * * * *